United States Patent [19]

Nordstrom

[11] Patent Number: 4,804,053

[45] Date of Patent: Feb. 14, 1989

[54] ROCKER PIN LOAD CELL

[75] Inventor: Kjell H. Nordstrom, Västerås, Sweden

[73] Assignee: Flintab AB, Västerås, Sweden

[21] Appl. No.: 118,949

[22] Filed: Nov. 10, 1987

[51] Int. Cl.[4] .................. G01G 3/14; G01G 21/24; G01L 1/22

[52] U.S. Cl. ................... 177/211; 177/255; 73/862.65

[58] Field of Search .............. 177/211, 255; 73/862.65

[56] References Cited

U.S. PATENT DOCUMENTS

| 2,962,276 | 11/1960 | Thurston . | |
|---|---|---|---|
| 3,164,014 | 1/1965 | Redner . | |
| 3,460,382 | 8/1969 | Schultheis, Jr. | 177/211 X |
| 3,621,927 | 11/1971 | Ormond | 177/211 X |
| 3,736,998 | 6/1973 | Flinth et al. . | |
| 3,997,014 | 12/1976 | Soderholm et al. . | |
| 4,162,628 | 7/1979 | Oetjen et al. . | |
| 4,248,317 | 2/1981 | Rahav | 177/134 |
| 4,483,404 | 11/1984 | Weihs | 177/255 |

FOREIGN PATENT DOCUMENTS

| 31030150 | 8/1982 | Fed. Rep. of Germany . | |
|---|---|---|---|
| 31030157 | 8/1982 | Fed. Rep. of Germany . | |
| 8030920 | 10/1982 | Fed. Rep. of Germany . | |
| 80309202 | 10/1982 | Fed. Rep. of Germany . | |
| 3405127 | 9/1985 | Fed. Rep. of Germany | 177/211 |
| 366116 | 4/1974 | Sweden . | |

Primary Examiner—George H. Miller, Jr.
Attorney, Agent, or Firm—Staas & Halsey

[57] ABSTRACT

A compression type load cell is provided consisting of a self-stabilizing rocker pin symmetrical about a primary longitudinal axis for measuring a load force applied to the load cell. Strain gages mounted circumferentially around a center section of the rocker pin measure the compressive force corresponding to the load force. Also provided is a weighing apparatus comprising a weighbridge with horizontal load transmitting surfaces resting on a plurality of self-stabilizing rocker pin load cells supported by horizontal base surfaces.

15 Claims, 5 Drawing Sheets

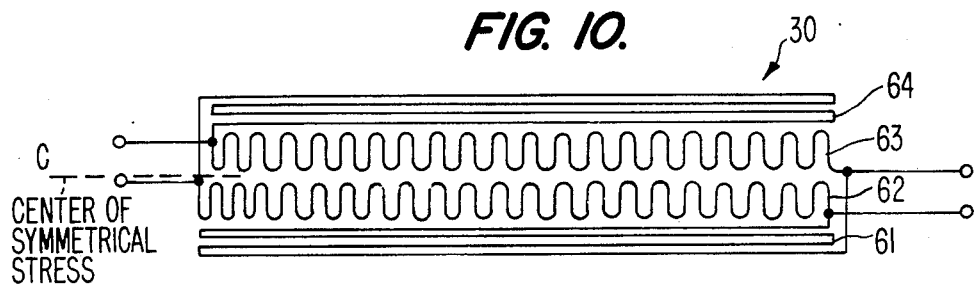
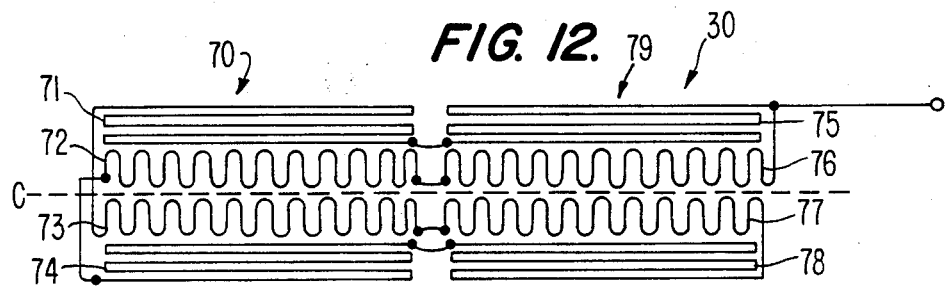
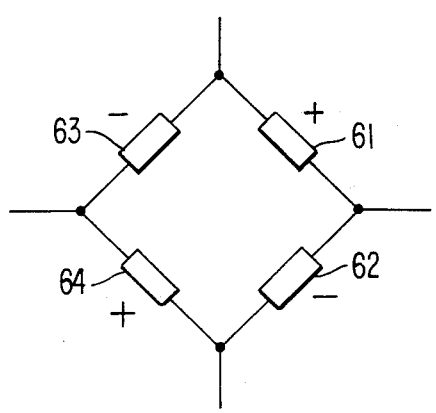
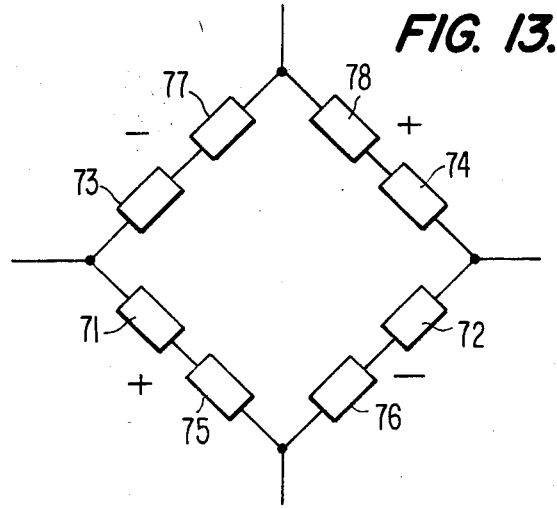

ROCKER PIN LOAD CELL

BACKGROUND OF THE INVENTION

1. Field of the Invention

This invention relates to strain gage load cells used for weighing heavy loads, and to weighing systems using the load cells.

2. Description of the Related Art

Strain gage load cells are used for weighing of trucks and railway cars, and for weighing of hoppers and tanks in the processing industry. A platform or a frame adapted to carry the load to be weighed is supported on a plurality of load cells resting on base plates below the platform or a frame, and the signals from the individual load cells are added electronically to obtain a signal or indication proportional to the total weight to be measured.

A load cell can measure a force in its sensing direction with high accuracy, but lateral forces and eccentric loading will cause errors in the output signal. Lateral forces and eccentric loading are introduced when a truck drives onto and brakes or accelerates on a weighing platform, when temperature changes due to direct sunlight and/or the ambient temperature cause thermal expansion of the platform or frame, and when the platform or frame deflects under load.

Ever since strain gage load cells were first used for weighing, more than three decades ago, designers and inventors have tried to minimize the detrimental effect of lateral forces and eccentric loading.

U.S. Pat. No. 2,962,276 describes a platform scale using compression load cells in the form of columns with spherical end surfaces fitted in matching spherical sockets in the platform and in the support structure. Membranes are provided to maintain the relative position of the platform and the support structure. The spherical sockets will provide compensation for misalignments during installation, and the membranes will contain the side forces caused by a truck entering the platform. Sliding friction between the end surfaces of the load cells and the matching spherical sockets will, however, cause bending stresses in the load cells whenever there is a change in relative position between the platform and the support structure. Thermal expansion and deflection of the platform under load cause such position changes, with corresponding errors in the load cell output signal that cannot be corrected. The scale shown in this patent accordingly cannot provide accurate weighing under normal operating conditions.

U.S. Pat. No. 3,164,014 describes a load cell where a compression column is mounted in a rigid housing with membranes shunting side forces away from the measuring section of the load cell. In addition, the strain sensors are positioned at a point where the effects of eccentric loading is minimized. This type of load cell works quite well as long as the side forces are moderate, but it must be loaded via roller bearings or other devices designed to remove the lateral forces caused by dimension changes when used with a large platform installed outdoors unprotected from environmental temperature changes. This adds to the cost and the complexity of the overall scale.

U.S. Pat. No. 3,736,998 describes a force application device designed for the type of load cell described in U.S. Pat No. 3,164,014. The device acts as a swing, allowing movement of the platform relative the load cell with only small residual side forces on the load cell. This combination works very well, and has been widely used commercially, but it is an expensive solution.

U.S. Pat. No. 4,162,628 is an alternative to the load cell according to U.S. Pat. No. 3,164,014, but it utilizes a shear sensing transducer instead of a compression column, which reduces the sensitivity to lateral forces and eccentric loading. Even this type of load cell cannot handle large dimensional changes directly, but it could possibly use teflon lubricated sliding plates instead of roller bearings.

Swedish Pat. No. 366 116 describes a combination of a load cell with special properties and a self-stabilizing rocking device. The load cell is designed to have a sensitivity which increases linearly when the load application center is moved away from the symmetry center, and decreases linearly when the angle of the resultant force deviates from the vertical. The patent describes how the measuring error can be reduced to near zero in this combination by selecting the radii and the height of the rocking device properly. The patent also states that such a load cell can be an integral part of the rocking device, but it does not disclose any such integrated design. It is doubtful if an integrated design will work with acceptable accuracy in practice, because there will not be any force component at right angle to the measuring axis in the described load cell when the load cell is integrated with the rocker device, and there will accordingly not be any error compensating effect as required by the patent. The fact that the patent owner has marketed only the separate load cell/rocker body combination, but never as an integrated design is further evidence that the integrated design does not work.

U.S. Pat. No. 4,248,317 describes an alternative to the swing device of U.S. Pat. No. 3,736,998. A compression type load cell, similar to U.S. Pat. No. 3,164,013 or U.S. Pat. No. 4,162,628, is mounted in a rigid housing with a membrane on top. A loading member with a spherical top surface in contact with a flat loading surface is mounted on the membrane, and the bottom of the housing is provided with another spherical surface in contact with a flat support surface. If the loading platform moves, or if its dimensions change relative the support structure, the load cell housing will roll essentially friction free between the two flat surfaces. The rolling will, however, make the axis of the load cell tilt from the vertical, which gives rise to a force component twisting the loading member on top of the load cell so the membrane will become S-shaped. The flexing of the loading member will cause a lateral force component on the load cell, with undesirable errors in the output signal, contrary to the theory of the patent. This design is also both expensive and bulky.

SUMMARY OF THE INVENTION

It is the primary objective of the invention to eliminate the problem of side loading on load cells caused by temperature effects in heavy industrial weighing equipment.

It is a further object of the invention to provide a very accurate load cell that is simple and inexpensive to manufacture.

It is a still further object of the invention to provide a weighing system that is inherently insensitive to errors caused by dimension changes and lateral forces by using a simple and inexpensive load cell without any costly loading devices between the load cell and the weighing apparatus.

Additional objects and advantages of the present invention will be set forth in part in the description which follows, and, in part, will be obvious from the description, or may be learned by practice of the invention. The objects and advantages of the invention may be realized and obtained by means of the instrumentalities and combinations particularly pointed out in the appended claims.

To achieve the foregoing objects and in accordance with the purpose of the invention, as embodied and broadly described herein, a weighing apparatus according to the invention comprises: a compression type load cell consisting essentially of an elongated dumbbell shaped column with a predetermined length having convex top and bottom surfaces and a midsection with symmetry about a primary axis of the column; strain gage means affixed to the midsection for measuring compressive force in the column; sealing means for protecting the strain gage means from moisture and other environmental effects; and means for electrically connecting the strain gage means to circuits outside the sealing means.

The compression type load cell is made so that the convex bottom surface is a surface portion of a first sphere having a first radius, the first sphere having a first center located on the primary axis, the convex top surface is a portion of a second sphere having a second center located on the primary axis, the sum of the first radius and the second radius being larger than the predetermined length so that the load cell will be self-stabilizing when placed in a vertical position between two substantially horizontal surfaces, and the strain gage means is centered on the midsection midway between the first and second centers at a right angle to the primary axis for integrating the compressive force around the column.

The design of the present invention achieves the goal sought for decades by load cell designers: a load cell for which the detrimental effect of lateral forces and eccentric loading have been essentially eliminated.

BRIEF DESCRIPTION OF THE DRAWINGS

FIGS. 10 and 12 are diagrams illustrating two alternative embodiments of the strain gages; and FIGS. 11 and 13 are schematic diagrams of the strain gages of FIGS. 10 and 12, respectively, connected in the arms of Wheatstone bridge circuits.

DETAILED DESCRIPTION OF THE PREFERRED EMBODIMENTS

Reference will now be made in detail to the present preferred embodiments of the invention, examples of which are illustrated in the accompanying drawings.

Figure 1:
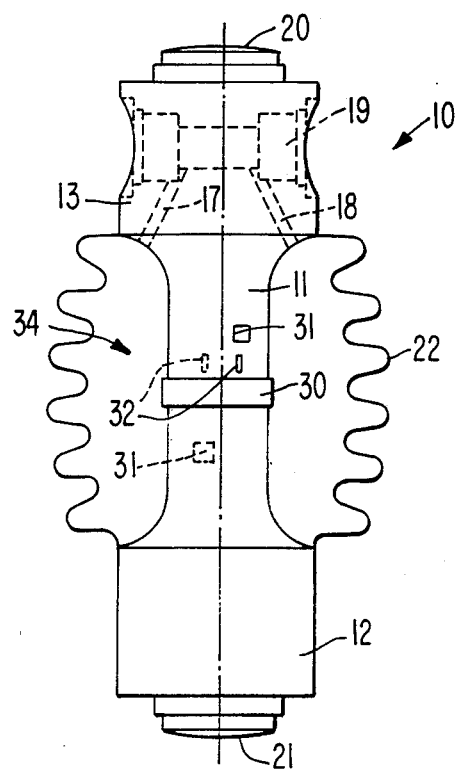
FIG. 1 is a side view partially in cross-section of the preferred embodiment of the rocker pin load cell of the present invention.

As illustrated in FIG. 1, the load cell 10 of the present invention is an elongated dumbbell shaped column which forms a self-stabilizing rocker pin. A rocker pin is a column with cylindrical or spherical end surfaces that acts like a roller or ball between two parallel surfaces when the two surfaces move relative to each other. A rocker pin is self-stabilizing when the sum of the radii of the curved surfaces is larger than the length of the column, as will be described in more detail below. The load cell can be constructed using a stainless steel or an alloy steel, both of which are used in most load cells today. A relatively rigid top portion 13 receives a load force on a convex top surface 20. The convex top surface 20 is a section of a surface of an imaginary sphere centered on the vertical primary longitudinal axis of the load cell 10 having a radius greater than or equal to one-half of the total length of the rocker pin load cell 10. In the preferred embodiment, a center portion 11 is a cylinder with smooth, rounded transition to the heavier end zones, providing the dumbbell shape. The center portion 11 is subject to a compressive stress caused by the load force applied to the top portion 13. A relatively rigid symmetrical bottom portion 12 supports the center portion 11. The bottom portion 12 has a convex bottom surface 21 which, like the spherical top surface 20, represents a partial surface of a sphere having a radius of at least one-half of the total length of the rocker pin load cell 10. The center portion 11 has strain gage means 34 in the form of strain gages 30 attached circumferentially thereto, temperature sensors 31 and linearizing gages 32, as will further be described below.

Figure 3:
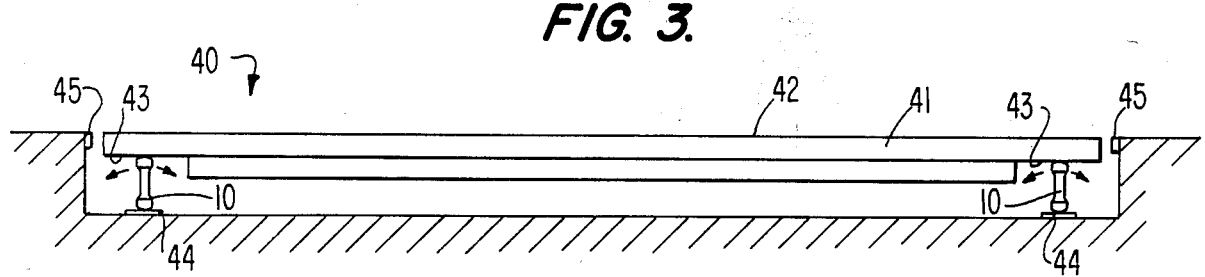
FIG. 3 is a side view of a weighing apparatus according to the present invention.
Figure 4:
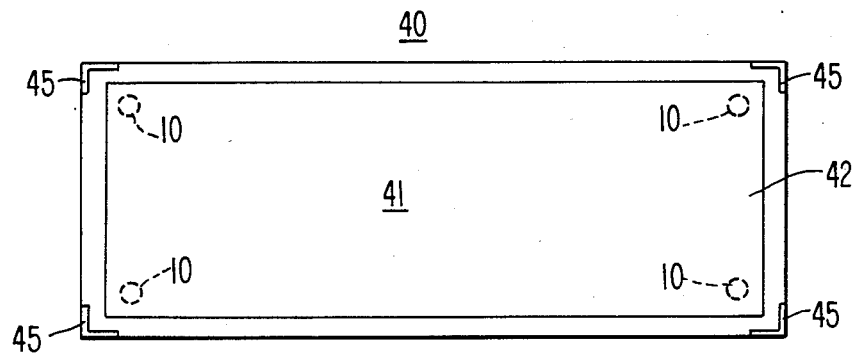
FIG. 4 is a top view of the weighing apparatus of FIG. 3 partially in cross-section.

Referring now to FIGS. 3 and 4, a weighing apparatus 40 which utilizes a plurality of the load cells 10 is illustrated. A weighbridge structure 41 has a top surface 42 for receiving the load to be weighed and several substantially flat and horizontal bottom surfaces 43 for transmitting the load to a plurality of load cells 10 supporting the weighbridge structure 41. Each load cell 10 supports one of the bottom surfaces 43, and stands upon a rigid and horizontal base surface 44. As illustrated in FIG. 3, the load cells 10, one placed near each corner of the weighbridge structure 41, support the structure 41 on their own. No additional support elements are necessary, although more than four load cells 10 may be used. To limit movement of the weighbridge structure 41, bumpers 45 are arranged around the weighbridge structure 41. When a side force is applied to the weighbridge structure 41, for example, when a truck is driven onto the weighbridge structure 41, the bumpers 45 limit the movement of the weighbridge structure 41. Due to the radii of the spherical surfaces 20, 21 of each of the load cells 10 being more than one-half of the total length of each load cell 10, the load cells 10 have a self-stabilizing and centering rocker action. Therefore, no added elements, such as flexure plates or the like, need to be added to support or align the weighbridge structure 41 or the load cells 10. Bumpers 45 act only to prevent the overall structure from moving too far from its equilibrium position under the influence of horizontal forces and do not touch the weighbridge 41 at all once the horizontal force becomes smaller than the centering action of the rocker pin load cells.

The function of the rocker pin load cell will now be described with reference to FIG. 2, which is a schematic cross-section of the load cell through its primary axis. The load cell has length H and is shown tilted from the vertical by an angle $\alpha$, as a result of a displacement of the top surface 43 relative to the bottom surface 44 because of a thermal expansion of the weighbridge 41. The vertical component of the load acting on the load cell is denoted F and acts on the load cell at the contact point between the load cell and the top surface 43. An equal and opposite vertical reaction force F' acts on the load cell at the contact point between the load cell and the bottom surface 44.

The top of the load cell is part of a sphere with radius $R_2$ and with its center on the primary axis. The bottom of the load cell is part of another sphere with radius $R_1$ and with its center also on the primary axis of the load cell. It can be seen directly from FIG. 2 that the horizontal distance d between the acting force F and the reaction force F' is:

$$d = (R_1 + R_2 - H)\sin\alpha$$

The pair of equal forces F and F' at a distance d sets up a restoring moment $M_R$:

$$M_R = Fd = F(R_1 + R_2 - H)\sin\alpha$$

The direction of the moment $M_R$ is such that it opposes the tilting of the load cell, and through friction between the load cell and the top and bottom surfaces 43, 44 the restoring moment $M_R$ opposes the relative displacement between the top surface 43 and the bottom surface 44. It will readily be seen from FIG. 2 that the vertical distance H' between the surfaces 43, 44 when the load cell is tilted as shown will be:

$$H' = R_1 + R_2 - (R1 + R_2 - H)\cos\alpha$$

For small values of angle $\alpha$, which always will be the case in practical weighing applications, one can assume that $\cos\alpha = 1$, so for practical purposes:

$$H' = H$$

Accordingly, the restoring force $F_r$ acting on the weighing platform will be:

$$F_R = M_S/H = (R_1/H + R_2/H - 1)\sin\alpha$$

Because the rocker pin rolls without slippage against the flat surfaces 43, 44, the total lateral displacement D of top surface 43 relative to bottom surface 44 for a tilting angle $\alpha$ in radians is:

$$D = R_1\alpha + R_2\alpha - (R_1 + R_2 - H)\sin\alpha$$

For small values of $\alpha$, which always is the case in practical weighing systems, we can assume $\sin\alpha = \alpha$, and we get:

$$D = H\alpha$$

From the formulas above it will be evident that the restoring force, and thereby the lateral stability of the weighing system, can be selected at will by varying $R_1/H$ and $R_2/H$. For a certain given maximum displacement, the magnitude of the tilting angle can be varied by a change in H. In all load cell applications the stress at the contact points must be within practical limits. This can easily be met in the load cell described herein by making the radii of the load cell end zones sufficiently large, without any detrimental effects on the restoring force.

The analysis above has demonstrated, that the only horizontal force component acting on a rocker pin load cell is the restoring force, which is predetermined by the designer. A lateral movement of the top surface 43 otherwise causes only rolling friction, which is negligible compared to the forces acting on ordinary, rigidly mounted load cells. On the other hand, the rocker pin load cell tilts, so it is not obvious that it will be possible to arrange strain gages so that their output signal will be an accurate measure of the vertical force F for any tilt angle. A further analysis indicates that the strain gage placement problem can be solved as explained below.

When a load cell as illustrated in FIG. 1 with symmetry about the primary axis is subjected to a compressive load along its primary axis, the stress is constant in any cross section perpendicular to the primary axis which is far enough from the end zones to avoid end effects. This is, however, not true when the compressive force is applied at an angle to the primary axis.

Figure 2:
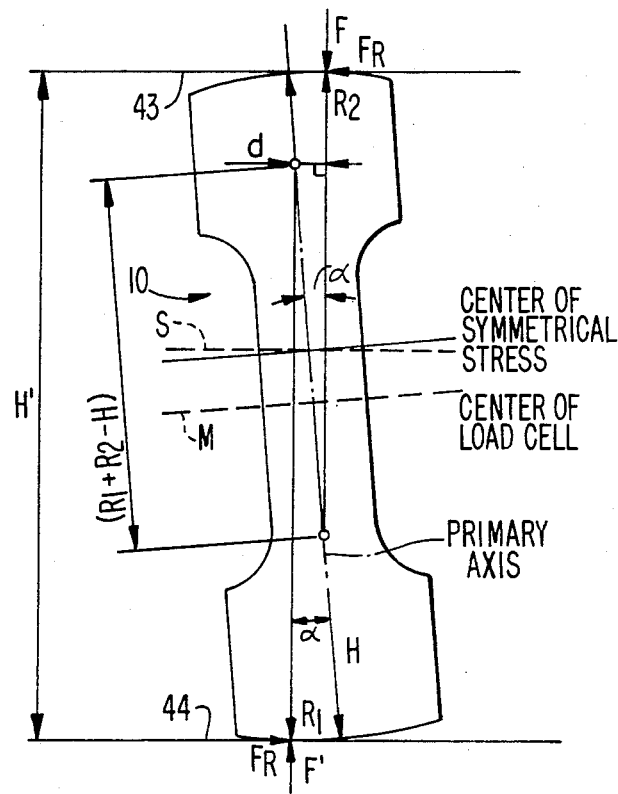
FIG. 2 is a schematic side view illustrating the forces associated with the restoring moment.

When the load cell is tilted as in FIG. 2, there is, one section through the load cell where the stress distribution is constant. This section is indicated in FIG. 2 by a horizontal dotted line S intersecting the primary axis of the load cell midway between the centers of spheres with radii $R_1$ and $R_2$. In this section the resultant of the compressive stress set up by force F and the equal reaction force F' will pass through the center of the section and be perpendicular to it, so the stress will be constant in this section. When the tilt angle varies, the section where the stress is the same in all points will remain horizontal, so it will seem to tilt about an axis through the midpoint between the centers of the two spheres $R_1$, $R_2$ and perpendicular to the plane of tilt. When the tilt angle is zero, the section where the stress is constant will be perpendicular to the primary axis of the load cell. This section is indicated by a solid line in FIG. 2, and is designated Center of Symmetrical Stress.

If one measures the stress along the circumference defined by the Center of Symmetrical Stress when the load cell is tilted, one would not get constant values in all points, but one can expect that the sign and the amount of the difference between the stress measured and the stress in the horizontal section where the stress is constant would be proportional to the distance between the actual and the ideal point of measurement. This means that if one adds the measurements in many points along a circumference defined by the Center of Symmetrical Stress, one would get the same value as if one adds measurements at the same angular positions along the circumference where the stress is equal. Thus, there is a way of measuring correctly independent of tilt angle.

Figure 7:
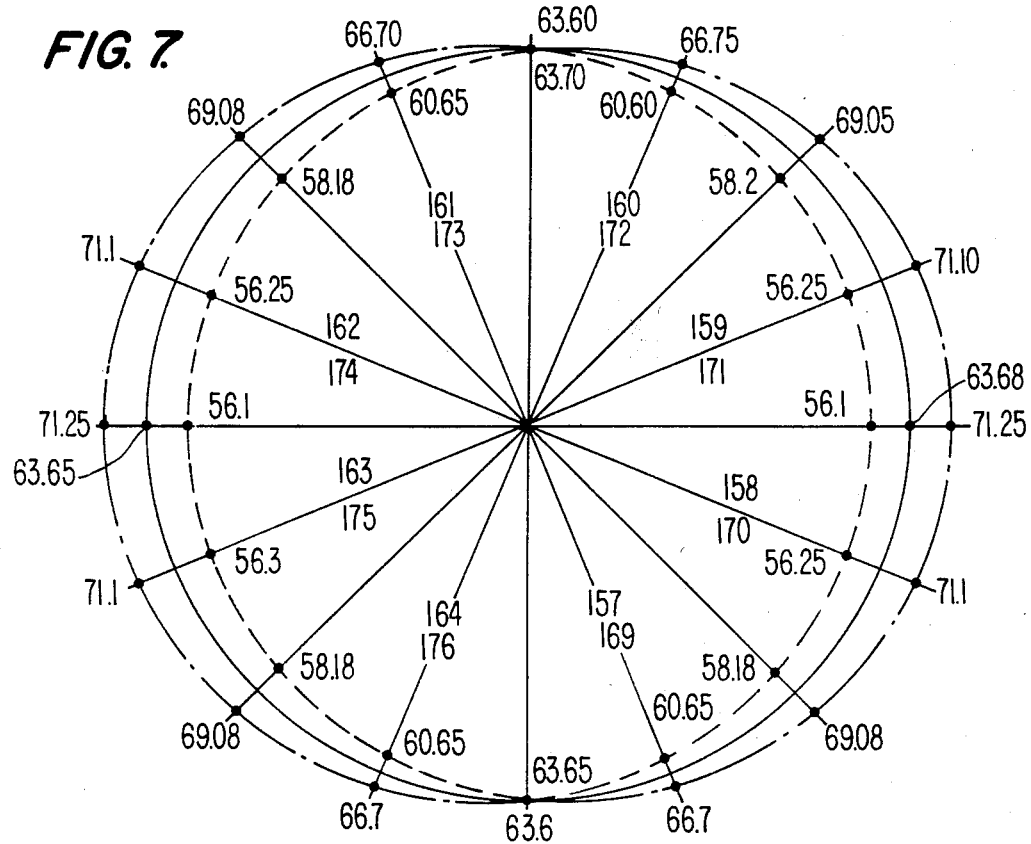
FIG. 7 is a graph showing the results of computer analysis of stress along the circumference of a cross-section of a load cell having a circular column at the symmetrical center of the load force.

The assumptions above have been verified by computer stress anaylsis using the finite element method. Results of such computer analysis are shown in FIG. 7, where the data on the center circle $C_A$ represents vertical surface strain measured at different locations around the Center of Symmetrical Stress for a load cell with zero tilt angle. For the vertical load cell, the measured surface strain is nearly the same at all points around the circle $C_A$. The data on the two other circles $C_B$ and $C_C$, represent the vertical surface strain in the same positions when left and right tilt was simulated, respectively. The sum of two diametrically opposite strains is the same in all three cases, which proves that an accurate measurement of the force F can be made for any tilt angle, if strain gages are arranged so that they integrate the stress around the load cell at the Center of Symmetrical Stress.

Figure 6A:
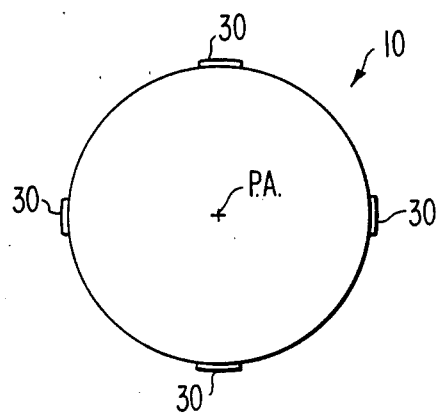
FIGS. 6A–6C are top views of a cross-section of center portions of load cells of different shapes as they relate to the present invention.
Figure 6B:
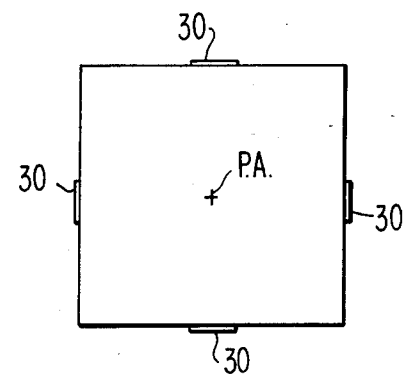
Figure 6C:
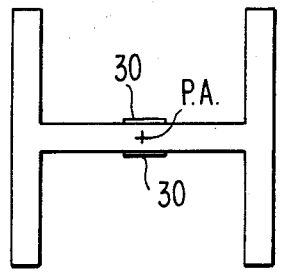

FIGS. 6A, 6B and 6C show cross-sections of three load cell columns with strain gages 30. FIG. 6A shows a load cell column having cylindrical cross-section and FIG. 6B shows a load cell column having square cross-section. In both cases there are four strain gages arranged symmetrically about the primary axis (P.A.) of the load cell, and they will measure the force F correctly at any tilt angle, in any tilt direction, as long as they are mounted on the Center of Symmetrical Stress and are accurately aligned diametrically opposite each other. This is possible because the average of the stresses at these diametrically opposed points is equal to the stress at these points when the tilt angle is zero. FIG. 6C shows a load cell column having a cross section shaped as an "H", with only two strain gages 30 mounted on the center web. This is a common design in conventional load cells. It will also measure correctly if the strain gages are located on the Center of Symmetrical Stress and are opposite each other, because the two strain gages are close to the center of the cross section.

So far there has been an assumption that the top surface 43 and the bottom surface 44 are both horizontal. In actual installations the bottom surface 44 can be adjusted very accurately, but the top surface 43 is not adjustable, so a certain misalignment must be anticipated. The top surface 43 will furthermore tilt when the weighing platform deflects under load as illustrated in FIG. 5B. Referring again to FIG. 2, one will see that a tilting of the top surface 43 will move the contact point at the top surface away from the position shown in FIG. 2, and the Center of Symmetrical Stress will accordingly move up or down from the position shown in the figure.

The deviation from horizontal is in practice quite small. Typical specification for the sum of misalignment and deflection is a maximum of 0.2 degrees, and 0.5 degrss is an absolute upper limit for the tilt of the upper surface in any type load cell scale installation. The strain gage arrangements shown in FIGS. 6A and 6B will measure accurately even in the presence of small unsymmetries in the strain pattern caused by such a tilt amount in the top surface 43, because the strain is summed in two orthogonal planes through the load cell column. The arrangement shown in FIG. 6C will, however, fail if the top surface 43 tilts about an axis parallel to the plane of the drawing and parallel to the flanges of the "H", because the center of the stress pattern will then move away from both strain gages and there are no diametrically opposed gages to compensate for the movement of center of the stress pattern, as there is in FIGS. 6A and 6B. A load column as shown in FIG. 6C is thus not particularly suitable for a rocker pin load cell.

FIG. 2 illustrates that the Center of Symmetrical Stress is not at the same position as the center of the load cell, indicated by a dotted line M, when the top and bottom spheres have different radii. In practice it is advantageous to mount the strain gages at the center of the load cell, because that is the one position where the stress pattern is least distorted by end effects. The Center of Symmetrical Stress is located at the center of the load cell only when the top and bottom spheres have equal radii ($R_{11} = R_2$). This is accordingly the preferred design of a load cell according to the invention.

The weighing apparatus 40 as illustrated in FIGS. 3 and 4 is built into the ground. The bottom surfaces 44 are reinforced rigid surfaces, generally of hardened steel, mounted on concrete foundations at the bottom of a pit in which the weighing apparatus is set. In an embodiment such as this, trucks can be driven onto the top of the weighbridge structure or items to be weighed can be placed on top of the weighbridge structure. Alternatively, the weighing apparatus can be placed on the ground or a floor. Trucks or similar devices to be weighed would then reach the load receiving top surface of the weighing apparatus via ramps. The ramps would then also serve as retaining walls for the apparatus. Bumpers would be attached thereto to limit the movement of the platform.

Weighing of hoppers or tanks can be done by supporting a frame around the hopper, or individual legs of a tank, on rocker pin load cells as described above for platforms. Bumpers can be used to limit movement of the hopper or individual legs as described above. Alternatively, one point of the frame, or one leg of the tank, may be fixed by using a regular shear beam load cell as measuring support, and using rocker pin load cells at other points to avoid side forces caused by thermal expansion.

Figure 5A:
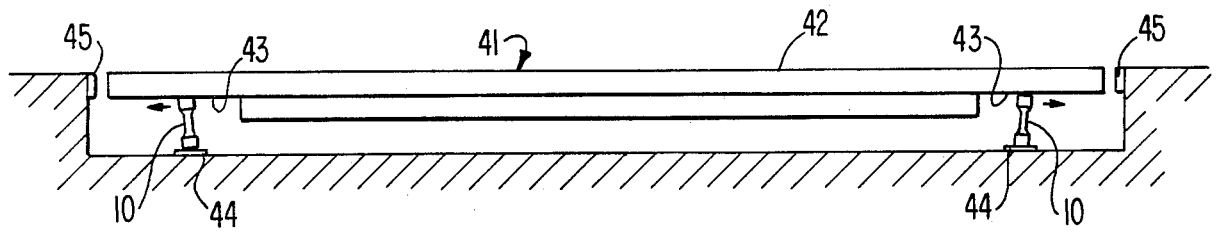
FIGS. 5A–5C are side views of the weighing apparatus according to the present invention as confronted with common problems arising during use.
Figure 5B:
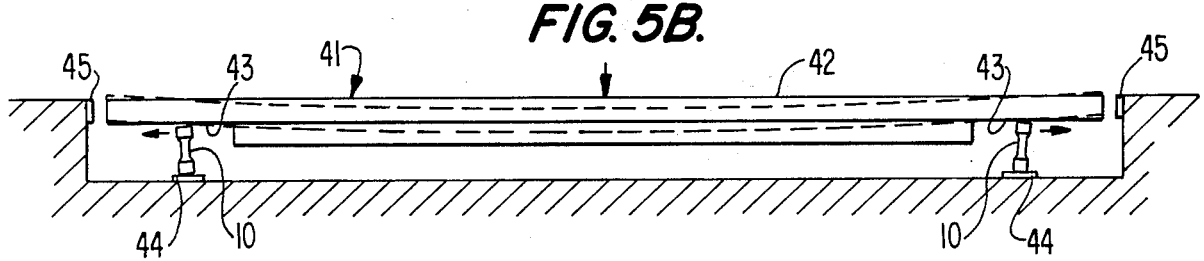
Figure 5C:
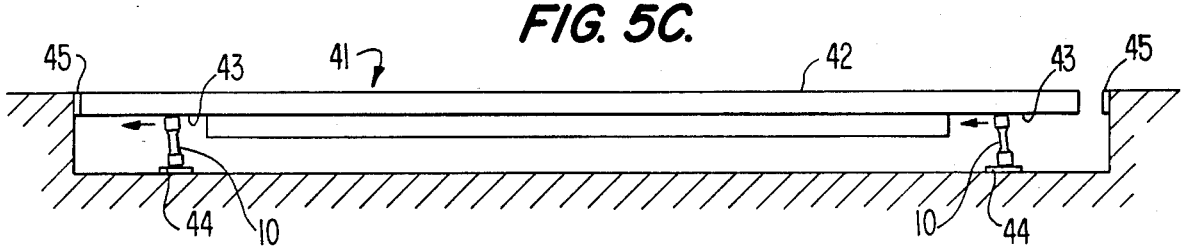

FIGS. 5A, 5B and 5C illustrate the everyday problems incurred by a weighing apparatus that have been solved by the present invention. FIG. 5A illustrates a situation when thermal expansion, either via direct sunlight or high temperatures, causes the weighbridge structure 41 to expand. The bottom surfaces 44 will not move apart to the extent of the expansion of the weighbridge structure 41. In the typical weighing apparatus, this thermal expansion would create side forces on load cells set rigidly in place because of friction. Any load applied to the weighbridge structure when a side force is present would be inaccurately measured.

This problem is solved by the present invention. The load cells 10 would tip slightly in response to the expansion of the weighbridge structure and only the predetermined restoring moment will arise and force measurement is accurate for reasons already set forth.

FIG. 5B illustrates the problem due to deflection of the weighbridge structure 41 under a load force. As explained above, the small deviation from horizontal in each load transmitting surface 43 will not cause unacceptable errors in a rocker pin load cell according to the present invention.

FIG. 5C illustrates the problem caused when a truck or other object to be weighed drives onto the weighbridge structure 41 and brakes. Once again lateral displacement is produced, but the bumpers 45 keep the weighing apparatus within pre-established vertical parameters, and the self-stabilizing action of the rocker pins recenter the load to be measured and the weighbridge structure removing it from contact with the bumpers.

Therefore, it is clear that a weighing system according to the present invention is unaffected by both lateral movement of the weighbridge and lateral expansion of the weighbridge, so it requires no anti-friction devices to limit side forces. The self-stabilizing action of the rocker pin load cell also eliminates the need for checkrods or membranes to keep the weighbridge in its proper position.

When the weighing system is installed, each load cell 10 is placed upright on its support surface 44. Temporary installation support structures keeps each of the load cell 10 in the vertical position during the installation process. The weigh platform is then simply lowered onto the load cells, and the temporary support structure is removed. No further mechanical supports are required, so no element can shunt part of the force to be measured past the load cells and thereby cause measuring errors. The only additional devices that might be needed are rubber booths or labyrinth seals to keep dirt from entering the rolling contact area between the load cell and surfaces 43, 44. Such devices are well known, and have no effect on the force measurement. A weighing system according to the invention is accordingly simple and inexpensive, and easy to install and maintain.

The detailed construction of a preferred load cell according to the invention is as follows:

Referring again to FIG. 1, the center portion 11 has strain gage means 30 attached circumferentially thereto. In the preferred embodiment, where $R_1 = R_2$, the strain gage means 34 comprises strain gages 30, attached around the circumference of the center portion 11 at the center of the load cell 10, midway between the top portion 13 and the bottom portion 12, temperature sensors 31 and linearizing gages 32.

A supply voltage is supplied to the strain gage means 34 from a scale instrument, as is known in the art, via wires in channels 17 and 19 drilled in the load cell, and the measuring voltage from the strain gage means 34 is carried by other wires in the same channels 17, 19 back to the scale instrument. The channels are required to get wires inside a bellows 22 of stainless steel or phosfor bronze, which is soldered to the end portions of the load cell as shown. The bellows 22 forms a hermetic seal protecting the strain gage means from humidity, moisture and other environmental factors, such as corrosive pollutants; however, the bellows 22 is mechanically weak, so it has no effect on the stress in the load cell column. The channels are provided with hermetically sealed feed-throughs (not shown) for the wires, as is well known in the art.

FIG. 1 shows that the channel 19 is drilled all the way through the top of the load cell, and a second channel 18 is drilled diametrally opposite to channel 17. The channel 18, as well as the right hand half of the channel 19 are drilled solely to maintain full symmetry in the top portion of the load cell, so the strain pattern in the load cell will be fully symmetrical about the primary axis. In some cases dummy channels might also be drilled in the bottom part of the load cell to maintain the stress pattern in the load cell symmetrical top to bottom. Also, relatively low stress concentration are necessary in the areas where the channels will be drilled. Therefore, the dumbbell shape having heavier ends and thus lower stress concentrations therein is preferred.

Figure 8:
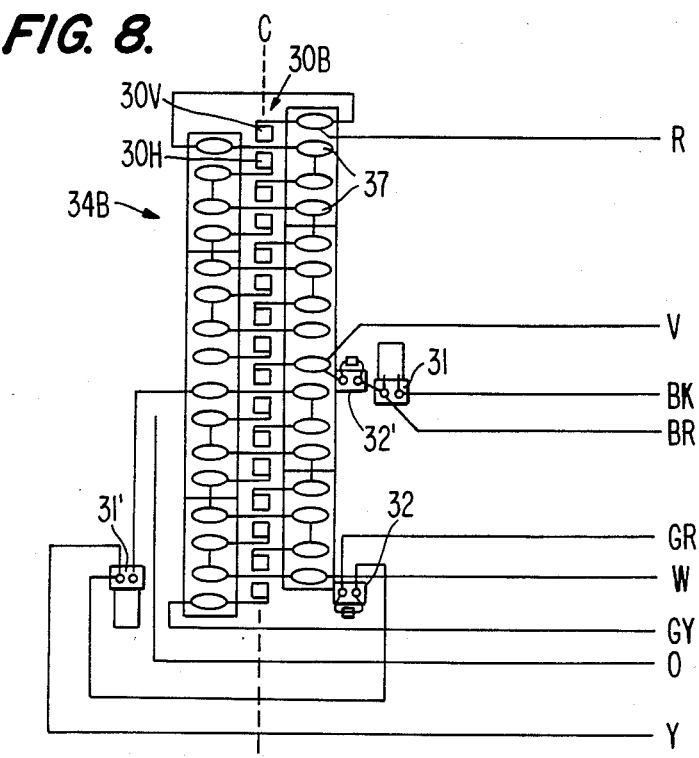
FIG. 8 is a view of the preferred embodiment of the strain gage means.

FIG. 6A and 6B illustrate a load cell with four measuring strain gages 30, which each can be a half bridge or a full bridge configuration, as is well known in the art. This arrangement will properly integrate the strain around the load cell column, provided they are mounted exactly 90 degrees apart and on the center of symmetrical stress. In production, however, it is difficult to align four strain gages with the accuracy required for a rocker pin load cell. It is easier to use several strain gages to form a substantially continuous band around the load cell column, as will be described below with reference to FIG. 8. FIG. 8 illustrates the preferred strain gage arrangement in a load cell according to the invention.

FIG. 8 shows a strain gage means 34B comprising a strip of bonding material having alternating vertical (30V) and horizontal (30H) strain gages deposited thereon. Such strips are commercially available in varying lengths and with varying module size. The individual strain gage units are connected to pads 37 of copper for interconnection and connection to feedwires and signal wires. A pair of temperature compensating sensors 31, 31' with connecting pads and a pair of linearizing gages 32, 32' with connecting pads are also included in the strain gage means 34B, as is known in the art.

Figure 9:
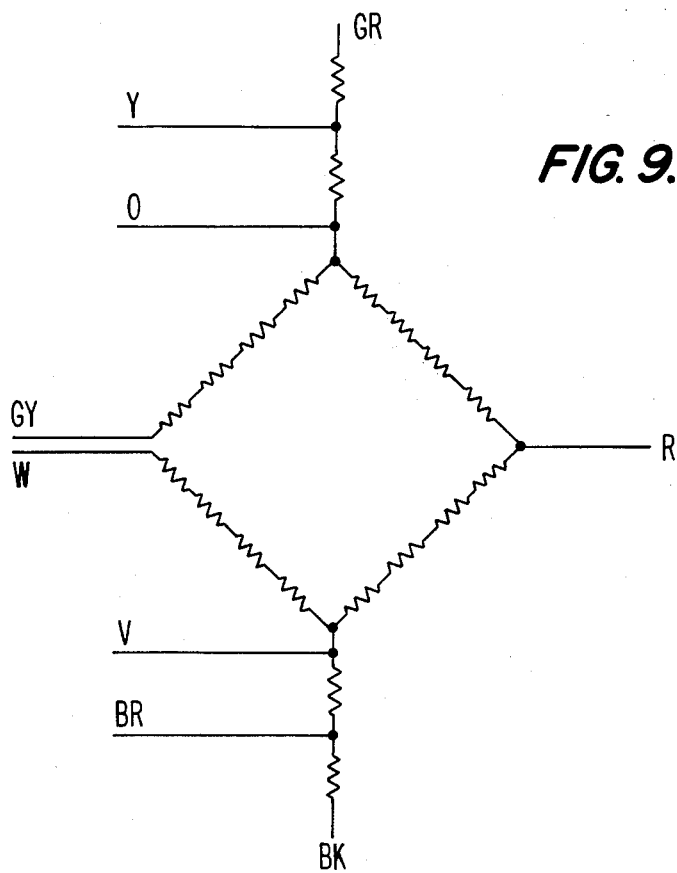
FIG. 9 is a schematic view of the strain gages of FIG. 8 connected in a Wheatstone bridge.

One long strip as shown, or a chain of shorter pieces fitting end to end, is glued on to the center portion of the load cell as shown in FIG. 1, so a continuous band of half bridges is formed around the load cell. The center line (C) of the strain gage chain is carefully centered on the Center of Symmetrical Stress, which in the preferred embodiment coincides with the center section of the load cell (where $R_1 = R_2$). The temperature sensors 31, 31' and the linearizing gages 32, 32' are arranged as shown in FIG. 8, so the members of each pair is located diametrically opposite each other when glued on to the load cell column. FIG. 9 shows the measuring strain gages interconnected to form a full Wheatstone bridge with one side open for external trimming of balance. The temperature sensors and the linearizing gages, as known in the art, are connected in series with the voltage supply to the Wheatstone bridge. The letters R, V, BK, BR, GR, W, GY, O and Y represent the color coding used for different colored wire leads and thereby indicate the relationship between FIGS. 8 and 9.

Alternative arrangements of the measuring strain gage means 30 for a load cell according to the invention are shown in FIG. 10 and FIG. 12. As illustrated in FIG. 10, strain gage means 30 comprises a strip of bonding material with two vertical strain gages 62, 63 and two horizontal strain gages 61, 64. The strip is of a length corresponding to the circumference of the load cell column, and it should be bonded on to the load cell column with its centerline C exactly over the Center of Symmetrical Stress, as explained before. In this case symmetry about the Center of Symmetrical Stress is achieved by the two symmetrically arranged vertical gages, and the likewise symmetrically arranged horizontal gages. The vertical gages, which measure the compressive strain and contribute 100% to the output, are arranged closest to the Center of Symmetrical Stress, while the horizontal gages, which measure the cross contraction and accordingly contributes only about 30% to the output, can be placed further from the centerline. The four gages are interconnected to form a full Wheatstone bridge, as shown in FIG. 11. Temperature sensors and linearizing gages in a fashion similar to the FIG. 8 embodiment are not shown in FIG. 10 and FIG. 11, but again are part of the strain gage means as known in the art.

FIG. 12 shows the same arrangement as in FIG. 10, but the strain gage means 30 comprises a two halves 70, 79, each half being a strip of bonding material with two vertical strain gages and two horizontal strain gages. This construction makes it easier to glue the strain gage means 30 onto the load cell column. The gages in FIG. 12 are connected in a full Wheatstone bridge as shown in FIG. 13. The temperature sensors and the linearizing gages again are not shown, but are used as is known in the art.

A load cell having a capacity of 50,000 lbs, in accordance with the design shown in FIG. 1 and the strain gage arrangement shown in FIG. 8 and FIG. 9, has a total length of about 170 mm. The center column has a diameter of about 27 mm, and the ends are about 50 mm in diameter. The radii of the spherical end surfaces are about 150 mm.

Many variations of the above described load cell and weighing system are possible according to the present invention. The load cell column might for instance be a cylindrical tube with the strain gage means mounted inside the tube and solid end pieces welded on after mounting of the strain gage means. This design would eliminatge the need for a bellows, but it would be difficult to assure a symmetrical stress pattern, and it would be difficult to bond the strain gages on with accurate centering on the Center of Symmetrical Stress.

Other variations concern the rocker pin action. A rocker pin action as described herein does not require flat top and bottom surfaces and spherical end surfaces on the load cell. Flat surfaces on the load cell can be combined with convex spherical top and bottom surfaces 43, 44 for the same self stabilizing effect, or convex top and bottom surfaces can be combined with spherical end surfaces with smaller radii on the load cell. It is only a question of selecting the proper relation between the curvature of the top and bottom surfaces and the curvature of the load cell ends. The surfaces also need not be spherical surfaces, but may have a variable curvature, such as, for example, parabolas. In practice, however, it is preferable to use flat top and bottom surfaces, because no centering of such flat surfaces is required. If the top and bottom surfaces were curved, exact centering of the surfaces relative to each other would be required in order for the load cell to work symmetrically about the vertical. Such centering would increase the cost and complexity of a weighing system considerably.

The strain gage means used are entirely conventional, and any variation common in the art can be used. The only requirement is that the strain gages measure symmetrically about the Center of Symmetrical Stress of the rocker pin load cell, and that they integrate properly around the load cell column as described herein. The linearizing gages should comprise a pair of gages arranged diametrically opposite each other and as close as possible to the Center of Symmetrical Stress for optimum linearization.

What is claimed is:

1. A compression type load cell consisting essentially of:
   an elongated dumbbell shaped column with a predetermined length having convex top and bottom surfaces and a midsection with symmetry about a primary axis of the column, said convex bottom surface being a surface portion of a first sphere having a first radius and a first center located on said primary axis, and said convex top surface being a surface portion of a second sphere having a second radius and a second center located on said primary axis, the sum of said first radius and said second radius being larger than said predetermined length so that said column will be self-stabilizing when placed in a vertical position between two substantially horizontal surfaces;

strain gage means affixed to said midsection midway between said first and said second centers at a right angle to said primary axis for integrating compressive strains around said column:

sealing means for protecting said strain gage means from moisture and other environmental effects; and means for electrically connecting said strain gage means to circuits outside said sealing means.

2. A compression type load cell according to claim 1, wherein said spheres are of substantially equal radii.

3. A compression type load cell consisting essentially of:
   (a) a self-stabilizing rocker pin with a longitudinal axis having
      (i) a top portion for receiving a load force to be measured and having a spherical top surface;
      (ii) a center portion symmetrical about said axis; and
      (iii) a bottom portion for supporting said center portion and having a spherical bottom surface;
   (b) strain gage means attached to said center portion for sensing the load force applied to said top portion;
   (c) bellow means attached to said rocker pin above and below said center portion for hermetically sealing said center portion against moisture and pollutants, said bellows means being mechanically weak so that effects of all forces acting on said rocker pin are essentially unchanged by said bellows means; and
   (d) means for electrically connecting said strain gage means to circuits outside said bellows means.

4. A load cell according to claim 3, wherein said center portion is a solid cylindrical shaft, and said strain gage sensing means are mounted on said center portion substantially midway between said top portion and said bottom portion for integrating a compressive force around said rocker pin corresponding to the load force.

5. A load cell according to claim 3, wherein said center portion is a solid square shaft, and said strain gage sensing means comprises four strain gage means centered on each face of said square shaft midway between said top portion and said bottom portion for integrating a compressive force around said rocker pin corresponding to the load force.

6. A weighing apparatus comprising:
   (a) a weighbridge structure having a load receiving top surface and a plurality of substantially flat and horizontal load transmitting bottom surfaces for receiving and transmitting a load force, respectively;
   (b) a plurality of self-stabilizing rocker pin load cells for receiving the load force from the load transmitting surfaces of said weighbridge structure, each of said load cells having a primary axis and a predetermined length and including
      (i) a top portion for receiving the load force to be measured having a spherical top surface,
      (ii) a center portion symmetrical about said primary axis,
      (iii) a bottom portion for supporting said center portion having a spherical bottom surface, and
      (iv) strain gage means attached to said center portion for sensing the load force received by said top portion; and
   (c) a plurality of substantially horizontal and rigid base means for supporting said load cells.

7. A weighing apparatus according to claim 6, wherein said spherical bottom surface is a surface portion of a first sphere having a first radius, said first sphere having a first center located on said primary axis, said spherical top surface is a portion of a second sphere having a second radius, said second sphere having a second center located on said primary axis, the sum of said first radius and said second radius being larger than said predetermined length so that said load cells are self-stabilizing when placed in a vertical position between said load transmitting surfaces and said base means, and said strain gage means is centered on said midsection midway between said first and second centers at a right angle to said primary axis for integrating the compressive force around said load cells.

8. A weighing apparatus according to claim 7, wherein said spheres are of substantially equal radii.

9. A weighing apparatus according to claim 6, further comprising bellows means soldered to said load cells above and below said center portion for hermetically sealing said center portion against humidity and pollutants, said bellows means being mechanically weak so that effects of the load force in said load cells are essentially unchanged by said bellows means.

10. In a weighing apparatus including a weighbridge structure for receiving a load force to be weighed having a load receiving top surface and a substantially horizontal load transmitting bottom surface and a substantially horizontal base surface, the improvement comprising:
(a) a self-stabilizing rocker pin positioned between said load transmitting bottom surface and said base surface for supporting said weighbridge structure, said rocker pin having
 (i) a top portion having a convex top surface for receiving the load force to be measured from said weighbridge structure,
 (ii) a bottom portion having a convex bottom surface resting on said base surface, and
 (iii) a center portion between said top portion and said bottom portion having a cross section symmetrical about a primary axis of said rocker pin; and
(b) strain gage sensing means mounted on the symmetrical cross section of said center portion of said rocker pin for measuring the load force.

11. A weighing apparatus comprising:
a support structure having a plurality of substantially horizontal top surfaces;
a plurality of self-stabilizing rocker pins of an equal predetermined length, each of said rocker pins having a convex bottom surface and corresponding to and resting on one of said substantially horizontal top surfaces of said support structure, and a convex top surface, each of said rocker pins having a portion between said top and said bottom surfaces having a cross section symmetrical about a primary axis of each of said rocker pins;
a flat and substantially horizontal loading structure having a plurality of flat bottom load transmitting surfaces, one corresponding to each of said rocker pins, said loading structure resting on and supported by the top surfaces of said rocker pins; and
strain gage means mounted on said symmetrical cross section of said rocker pins arranged to measure a compressive force in said rocker pins caused by a load being applied onto said loading structure.

12. A weighing apparatus as recited in claim 11 wherein:
said convex bottom surface is a surface portion of a first sphere having a first radius, said first sphere having a first center located on said primary axis;
said convex top surface is a surface portion of a second sphere having a second radius, said second sphere having a second center located on said primary axis; and
the sum of said first radius and said second radius is larger than the predetermined length of one of said rocker pins.

13. A weighing apparatus as recited in claim 12, wherein said strain gage means is centered on a section of each of said rocker pins at a right angle to said primary axis and which intersects said primary axis midway between said first and said second centers.

14. A weighing apparatus as recited in claim 12, wherein said strain gage means is mounted around said symmetrical portion of each of said rocker pins for integrating the compressive force.

15. A weighing apparatus including a weighbridge structure having a load receiving top surface for receiving a load to be weighed and at least one substantially horizontal load transmitting bottom surface resting on load cell means, and a substantially horizontal base surface for supporting the load cell means, the load cell means consisting essentially of:
a self aligning rocker pin having symmetry about a primary axis;
strain gage means affixed to said rocker pin for measuring a compressive force substantially parallel to the primary axis;
sealing means for protecting said strain gage means from moisture and pollutants; and
means for electrically connecting said strain gage means to circuits outside said sealing means.

* * * * *

REEXAMINATION CERTIFICATE (2982th)

United States Patent [19]

Nordstrom

[11] B1 4,804,053

[45] Certificate Issued Sep. 3, 1996

[54] ROCKER PIN LOAD CELL

[75] Inventor: Kjell H. Nordstrom, Västerås, Sweden

[73] Assignee: Flintab AB, Västerås, Sweden

Reexamination Request:
No. 90/003,959, Sep. 15, 1995

Reexamination Certificate for:
| | |
|---|---|
| Patent No.: | 4,804,053 |
| Issued: | Feb. 14, 1989 |
| Appl. No.: | 118,949 |
| Filed: | Nov. 10, 1987 |

[51] Int. Cl.$^6$ ............... G01G 3/14; G01G 21/24; G01L 1/22
[52] U.S. Cl. ............... 177/211; 177/225; 73/862.622; 73/862.629
[58] Field of Search ............... 177/211, 255; 73/862.622, 862.629

[56] References Cited

U.S. PATENT DOCUMENTS

| | | |
|---|---|---|
| 2,962,276 | 11/1960 | Thurston . |
| 3,164,014 | 1/1965 | Redner . |
| 4,248,317 | 2/1981 | Rahav . |
| 4,554,987 | 11/1985 | Dillon . |
| 4,589,291 | 5/1986 | Sander . |
| 4,609,062 | 9/1986 | Hale et al. . |
| 4,716,979 | 1/1988 | Bradley et al. ............... 177/255 X |

FOREIGN PATENT DOCUMENTS

| | | |
|---|---|---|
| 1806668 | 5/1973 | Germany . |
| 2234025 | 1/1974 | Germany . |
| 2546890 | 4/1976 | Germany . |

OTHER PUBLICATIONS

"Minutes" from Oral Hearings before the European Patent Office Document No. 88 118 067.3 pp. 1–9.

"Letter from HBN" pp. 2–10 Sep. 1, 1995 (Fax No. 49 40 4802502).

"Document from Opposition Proceedings" pp. 1–7.

"Preparation of Oral Proceedings" pp. 1–3 Jun. 30, 1995.

Siemens, Load Cells of the K Seriess 7MH3105, Fed. Rep. of Germany, Jul. 1984, cover page, pp. 1–8, enlarged FIGS. 3/1;1/2;1/5;2/1.

Siemens Katalog MP14, 1976, cover sheet, p. 1/8.

HBM "Hinweise zur Mechanik von HBM Kraftaufnehmer Einbaufällen", May 1976, cover page, pp. 25, 26.

HBM "Einbau von Wägezellen", Apr. 1986, cover page, p. 5, last page.

NBS (National Bureau of Standards) Characteristics and Applications of Resistance Strain Gages, Circular 528, Feb. 1954, title page, p. 125, FIG. 10.4.

Primer "Strain Gage Primer" Perry et al., McGraw Hill, 1955, title page, p. 205, FIG. 11–9.

Rohrbach, Christof: Hanbuch for Elektrisches, 1967, pp. 498–506, 1967.

Siemens Aktiengesellschaft, Katalog MP14—1983, Elektromechanische Waagen, Ungultig: Katalog MP14—1976 und Anderungen Nov. 1977, pp. 1/2 and 1/8.

Siemens, Wagezelle Reihe K 7MH3105, pp. 1–9.

*Primary Examiner*—Brian W. Brown

[57] ABSTRACT

A compression type load cell is provided consisting of a self-stabilizing rocker pin symmetrical about a primary longitudinal axis for measuring a load force applied to the load cell. Strain gages mounted circumferentially around a center section of the rocker pin measure the compressive force corresponding to the load force. Also provided is a weighing apparatus comprising a weighbridge with horizontal load transmitting surfaces resting on a plurality of self-stabilizing rocker pin load cells supported by horizontal base surfaces.

B1 4,804,053

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 6, 10, 11 and 15 are determined to be patentable as amended.

Claims 2, 4, 5, 7, 8, 9, 12, 13 and 14, dependent on an amended claim, are determined to be patentable.

1. A compression type load cell consisting essentially of:
an elongated dumbbell shaped column with a predetermined length having convex top and bottom surfaces and a midsection with symmetry about a primary axis of the column, said convex bottom surface being a surface portion of a first sphere having a first radius and a first center located on said primary axis, and said convex top surface being a surface portion of a second sphere having a second radius and a second center located on said primary axis, the sum of said first radius and said second radius being larger than said predetermined length so that said column will be self-stabilizing when placed in a vertical position between two substantially horizontal surfaces;
strain gage means affixed to said midsection midway between said first and second centers at a right angle to said primary axis for integrating compressive strains around said column *and for providing an output substantially independent of a tilt angle of said column*;
sealing means for protecting said strain gage means from moisture and other environmental effects; and
means for electrically connecting said strain gage means to circuits outside said sealing means.

3. A compression type load cell consisting essentially of:
(a) a self-stabilizing rocker pin with a longitudinal axis having
 (i) a top portion for receiving a load force to be measured and having a spherical top surface;
 (ii) a center portion symmetrical about said axis; and
 (iii) a bottom portion for supporting said center portion and having a spherical bottom surface;
(b) strain gage means attached to said center portion for sensing the load force applied to said top portion *by integrating strains around the center portion and for providing an output substantially independent of a tilt angle of said self-stabilizing rocker pin*;
(c) [bellow] *bellows* means attached to said rocker pin above and below said center portion for hermetically sealing said center portion against moisture and pollutants, said bellows means being mechanically weak so that effects of all forces acting on said rocker pin are essentially unchanged by said bellows means; and
(d) means for electrically connecting said strain gage means to circuits outside said bellows means.

6. A weighing apparatus comprising:
(a) a weighbridge structure having a load receiving top surface and a plurality of substantially flat and horizontal load transmitting bottom surfaces for receiving and transmitting a load force, respectively;
(b) a plurality of self-stabilizing rocker pin load cells for receiving the load force from the load transmitting surfaces of said weighbridge structure, each of said load cells having a primary axis and a predetermined length and including
 (i) a top portion for receiving the load force to be measured having a spherical top surface;
 (ii) a center portion symmetrical about said primary axis,
 (iii) a bottom portion for supporting said center portion having a spherical bottom surface, and
 (iv) strain gage means attached to said center portion for sensing the load force received by said top portion *by integrating strains around the center portion and for providing an output substantially independent of a tilt angle of said load cell*; and
(c) a plurality of substantially horizontal and rigid base means for supporting said load cells.

10. In a weighing apparatus including a weighbridge structure for receiving a load force to be weighed having a load receiving top surface and a substantially horizontal load transmitting bottom surface and a substantially horizontal base surface, the improvement comprising:
(a) a self-stabilizing rocker pin positioned between said load transmitting bottom surface and said base surface for supporting said weighbridge structure, said rocker pin having
 (i) a top portion having a convex top surface for receiving the load force to be measured from said weighbridge structure,
 (ii) a bottom portion having a convex bottom surface resting on said base surface, and
 (iii) a center portion between said top portion and said bottom portion having a cross section symmetrical about a primary axis of said rocker pin; and
(b) strain gage sensing means mounted on the symmetrical cross section of said center portion of said rocker pin for measuring the load force *by integrating strains around the center portion and for providing an output substantially independent of a tilt angle of said rocker pin*.

11. A weighing apparatus comprising:
a support structure having a plurality of substantially horizontal top surfaces;
a plurality of self-stabilizing rocker pins of an equal predetermined length, each of said rocker pins having a convex bottom surface and corresponding to and resting on one of said substantially horizontal top surfaces of said support structure, and a convex top surface, each of said rocker pins having a portion between said top and said bottom surfaces having a cross section symmetrical about a primary axis of each of said rocker pins;
a flat and substantially horizontal loading structure having a plurality of flat bottom load transmitting surfaces, one corresponding to each of said rocker pins, said loading structure resting on and supported by the top surfaces of said rocker pins; and
strain gage means mounted on said symmetrical cross section of said rocker pins *and* arranged to measure a compressive force in said rocker pins caused by a load being applied onto said loading structure *by integrating strains around the symmetrical cross section and for providing an output substantially independent of a tilt angle of said rocker pin.*

15. A weighing apparatus including a weighbridge structure having a load receiving top surface for receiving a load to be weighed and at least one substantially horizontal load transmitting bottom surface resting on load cell means, and a substantially horizontal base surface for supporting the load cell means, the load cell means consisting essentially of:

a self aligning rocker pin having symmetry about a primary axis;

strain gage means affixed to said rocker pin for measuring a compressive force substantially parallel to the primary axis *by integrating strains around said rocker pin and for providing an output substantially independent of a tilt angle of said rocker pin;* sealing means for protecting said strain gage means from moisture and pollutants; and means for electrically connecting said strain gage means to circuits outside said sealing means.

* * * * *